US012573155B2

(12) United States Patent
Fu et al.

(10) Patent No.: US 12,573,155 B2
(45) Date of Patent: Mar. 10, 2026

(54) WEARABLE DEVICE SYSTEM FOR CROSS-REALITY VISION

(71) Applicant: Future Full-Screen Tong Intelligent Technology Group Co., Ltd., Wuhan (CN)

(72) Inventors: Jinlong Fu, Wuhan (CN); Yihong Fu, Wuhan (CN); Shuo Xing, Wuhan (CN)

( * ) Notice: Subject to any disclaimer, the term of this patent is extended or adjusted under 35 U.S.C. 154(b) by 152 days.

(21) Appl. No.: 18/408,008

(22) Filed: Jan. 9, 2024

(65) Prior Publication Data

US 2025/0225737 A1     Jul. 10, 2025

(51) Int. Cl.
*G06T 19/00*         (2011.01)
*G02B 27/01*         (2006.01)

(52) U.S. Cl.
CPC ........ *G06T 19/006* (2013.01); *G02B 27/0172* (2013.01)

(58) Field of Classification Search
CPC .............. G06T 19/006; G02B 27/0172; G02B 27/0176; G02B 2027/0123; G02B 2027/0178
See application file for complete search history.

(56) References Cited

U.S. PATENT DOCUMENTS

| | | | | |
|---|---|---|---|---|
| 10,712,576 B1 * | 7/2020 | McEldowney | ...... | G03H 1/0248 |
| 2002/0060850 A1 * | 5/2002 | Takeyama | .......... | G02B 27/0172 |
| | | | | 359/639 |

| | | | | |
|---|---|---|---|---|
| 2002/0105737 A1 * | 8/2002 | Takahashi | .......... | G02B 27/0172 |
| | | | | 359/837 |
| 2002/0163734 A1 * | 11/2002 | Inoguchi | .............. | G02B 27/144 |
| | | | | 359/627 |
| 2012/0075168 A1 * | 3/2012 | Osterhout | ............... | G06F 3/017 |
| | | | | 345/8 |
| 2014/0361957 A1 * | 12/2014 | Hua | .................... | G02B 27/0093 |
| | | | | 345/8 |
| 2015/0177519 A1 * | 6/2015 | Cakmakci | .......... | G02B 27/0172 |
| | | | | 359/631 |
| 2017/0276918 A1 * | 9/2017 | Hua | ........................ | G02B 17/08 |
| 2018/0045964 A1 * | 2/2018 | Jones | ................. | G02B 27/0172 |
| 2019/0260982 A1 * | 8/2019 | Hua | .................... | G02B 27/0172 |

FOREIGN PATENT DOCUMENTS

| | | | | | |
|---|---|---|---|---|---|
| JP | | 2001013446 A | * | 1/2001 | |
| WO | WO-2020047559 A2 | * | 3/2020 | .............. | G02C 7/086 |

* cited by examiner

*Primary Examiner* — Jeffery A Brier
(74) *Attorney, Agent, or Firm* — Che-Yang Chen; Law Office of Michael Chen

(57)         ABSTRACT

A wearable device system for a cross-reality vision, including a virtual reality image, an augmented reality image, a real-world image, and a mixed reality image, includes an optical combiner configured to receive a virtual reality content from an outside electricity device; a supporting frame where the optical combiner is supported thereon; a wearable band coupled to the supporting frame; wherein the supporting frame comprises an adjustable frame angledly and pivotally coupled to the wearable band; wherein the optical combiner is configured to partially cover eyes of an observer and includes a first free-form optical component, a second free-form optical element overlappedly arranged with the first free-form optical component, and a microdisplay arranged adjacent to the first free-form optical component.

20 Claims, 15 Drawing Sheets

| Surface | 14b | 12a |
|---|---|---|
| Vertex Radius of Curvature | 372.40 (Fifth Vertex Radius of Curvature) | -62.88 (Second Vertex Radius of Curvature) |
| Constant (k) for quadratic surface | 11.03 | 0.778 |
| X2Y0 | 7.86994E-03 | -4.68268E-03 |
| X0Y2 | -2.98816E-03 | 7.77166E-03 |
| X2Y1 | 1.22759E-04 | -2.51925E-04 |
| X0Y3 | -7.21903E-06 | -3.80886E-05 |
| X4Y0 | -7.08964E-06 | 1.38188E-05 |
| X2Y2 | -2.19578E-06 | -5.95763E-06 |
| X0Y4 | -6.86605E-07 | -2.32038E-06 |
| X4Y1 | 2.13164E-07 | -5.34336E-07 |
| X2Y3 | 2.67013E-07 | -5.82637E-07 |
| X0Y5 | 1.25106E-07 | -1.08294E-07 |

FIG. 11A

| Surface | Types of Surface | Radius of Curvature | Thickness | Refractive Index/ Abbe Number | Surface Properties | Y-bias (mm) | Z-bias (mm) | Angle of Inclination (Alhpa) |
|---|---|---|---|---|---|---|---|---|
| 14b | XY-polynomial | 372.40 | 10.6 | 1.53/53.4 | Reflection | -3.00 | 0 | -1.57 |
| 12a | XY-polynomial | -62.88 | 18.5 | / | Refraction | 2.67 | 0 | -3.43 |
| | Aperture | -159.5 | / | / | Refraction | / | / | / |

FIG. 11B

| Surface | Types of Surface | Radius of Curvature | Thickness | Refractive Index/ Abbe Number | Surface Properties | Types of Coordinate System | Y-bias (mm) | Z-bias (mm) | Angle of Inclination (Alhpa) |
|---|---|---|---|---|---|---|---|---|---|
| 11 | Aperture | Infinite | / | / | Reflection | / | / | / | / |
| 12a | XY-polynomial | -62.9 (second radius of curvature) | / | 1.53/53.4 | Refraction | World Coordinate System | 2.7 | 18.5 | 3.4 |
| 12b | XY-polynomial | -41.6 (third radius of curvature) | / | 1.53/53.4 | Reflection | World Coordinate System | -0.3 | 24.4 | -24.5 |
| 12a | XY-polynomial | -62.9(second radius of curvature) | / | 1.53/53.4 | Refraction | World Coordinate System | 2.7 | 18.5 | 3.4 |
| 12c | XY-polynomial | -150.5 (first radius of curvature) | / | 1.53/53.4 | Reflection | World Coordinate System | 20.6 | 25.8 | 13.3 |
| 12d | Non-aspheric surface | 7.1 | / | / | Refraction | World Coordinate System | 25.1 | 18.3 | -30.0 |
| 13a | Aspheric Surface | Infinite | -0.7 | 1.52/64.3 | Refraction | World Coordinate System | 24.8 | 17.6 | -28.3 |
| 13b | Aspheric Surface | Infinite | / | / | / | / | / | / | / |

FIG. 12

| Surface | 12a | 12b | 12c |
|---|---|---|---|
| Vertex Radius of Curvature | -62.88 (second radius of curvature) | -41.59 (third radius of curvature) | -150.51 (first radius of curvature) |
| Constant (k) for quadratic surface | 0.778 | -0.276 | -9.785 |
| X2Y0 | -4.68268E-03 | -1.53812E-03 | -2.91521E-03 |
| X0Y2 | 7.77166E-03 | 4.85138E-03 | 2.37598E-03 |
| X2Y1 | -2.51925E-04 | -4.22512E-05 | -2.12717E-04 |
| X0Y3 | -3.80886E-05 | -1.11876E-04 | -1.13199E-04 |
| X4Y0 | 1.38188E-05 | 2.90956E-06 | 1.04537E-05 |
| X2Y2 | -5.95763E-06 | -2.50722E-06 | -7.20953E-06 |
| X0Y4 | -2.32038E-06 | -7.53453E-07 | -7.32529E-06 |
| X4Y1 | -5.34336E-07 | -3.24567E-07 | -3.14365E-08 |
| X2Y3 | -5.82637E-07 | 8.27262E-08 | -1.95461E-07 |
| X0Y5 | -1.08294E-07 | 2.45615E-07 | -3.27112E-07 |
| X6Y0 | / | -2.87012E-09 | -3.36124E-08 |
| X4Y2 | / | 1.92866E-08 | -4.88417E-08 |
| X2Y4 | / | 1.84886E-08 | 8.48817E-08 |
| X0Y6 | / | -6.62105E-10 | -3.68740E-08 |
| X6Y1 | / | -6.36609E-10 | 4.76741E-10 |
| X4Y3 | / | -1.11049E-09 | -9.60165E-10 |
| X2Y5 | / | -4.05308E-09 | 1.78709E-09 |
| X0Y7 | / | -3.87454E-10 | 6.99315E-10 |
| X8Y0 | / | 9.49478E-12 | 1.37391E-10 |
| X6Y2 | / | 5.27595E-11 | 3.56954E-10 |
| X4Y4 | / | -4.16873E-11 | -1.03144E-10 |
| X2Y6 | / | 1.93347E-10 | -6.77227E-10 |
| X0Y8 | / | -2.14475E-11 | 3.10869E-10 |

FIG. 13

| Surface | 12d |
|---|---|
| Vertex Radius of Curvature | 7.06 |
| Constant (k) for quadratic surface | -10 |
| A2 | 4.53623E-06 |
| A3 | -1.02095E-06 |
| A4 | 1.33144E-08 |
| A5 | -9.37255E-11 |
| A6 | 2.79499E-13 |

FIG. 14

WEARABLE DEVICE SYSTEM FOR CROSS-REALITY VISION

FIELD OF THE DISCLOSURE

The present disclosure relates to a wearable device, and more particularly to a wearable device system which is not only to provide a virtual reality vision, an augmented reality vision, a real-world vision, and a mixed reality vision but also could allow the observer to view the virtual/augmented reality vision and the real-world vision at the same time.

BACKGROUND OF THE DISCLOSURE

Generally, in recent years, near-eye display technologies are developing rapidly. Among the near-eye display technologies, the Virtual Reality (VR) technology and the Augmented Reality (AR) technology dominate. In the existing near-to-eye display devices with VR display, AR display, and other functions, the human eyes may be fully covered by the near-to-eye display device, and in such a manner, the optimal viewing position and the optimal viewing angle are fixed. The human eyes must view the picture at the fixed optimal viewing position and the fixed optimal viewing angle, so that a better viewing effect can be achieved.

In addition, in practical applications, when the user wears the near-eye display device, the eyes of the user are often very close to the near-eye display device. It is a hassle for the user who wears a glasses. However, the current near-eye display device may only provide a single near-eye display technology function, for example, only provide a virtual reality image or the augmented reality image. Therefore, there is a continuing need for new ways to allow the user to obtain the virtual reality images, the augmented reality images, and the real-world images by using only a single near-eye display device.

All referenced patents, applications and literature are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF SUMMARY OF THE DISCLOSURE

In a general implementation, the wearable device system for a cross-reality vision, including a virtual reality image, an augmented reality image, a real-world image, and a mixed reality image, may comprise an optical combiner configured to receive a virtual reality content from an outside electricity device; a supporting frame where the optical combiner is supported thereon; a wearable band coupled to the supporting frame; wherein the supporting frame comprises an adjustable frame angledly and pivotally coupled to the wearable band; wherein the optical combiner is configured to partially cover eyes of an observer and comprises a first free form optical component, a second free form optical element, and a microdisplay.

In another aspect combinable with the general implementation, the optical combiner remains at a visual distance of 17 mm to 22 mm from the eyes of the observer.

Among the many possible implementations of the wearable device system, the wearable device comprises a lens cover fully covered on an outer surface of the optical combiner to prevent lights from outside of the wearable device.

Further, it is contemplated that the wearable device system may further comprise a lens cover fully covered on an outer surface of the optical combiner, and the optical combiner comprises an inner surface face towards the eyes of the observer.

In the alternative, the wearable device system may further comprise a real-world field of view of up to 30 degrees below a straight-ahead view and an augmented reality field of view of up to 30 degrees above the straight-ahead view, wherein the real-world field of view allows the user to see a real-world scene and an augmented reality image is projected into the augmented reality field of view.

It is still further contemplated that the wearable device system may further comprise a lens cover fully covered on an outer surface of the optical combiner, and a real-world field of view of up to 30 degrees below a straight-ahead view and a virtual reality field of view of up to 30 degrees above the straight-ahead view, wherein the real world field of view allows the user to see a real-world scene and a virtual reality image is projected into the virtual reality field of view.

In another aspect combinable with the general implementation, the first free-form optical component comprises a non-aspheric surface having a vertex radius of curvature of above 7 and arranged adjacent to the microdisplay, wherein lights from the microdisplay are refracted into the first free-form optical component through the non-aspheric surface.

In another aspect combinable with the general implementation, the first free-form optical component comprises a second reflection surface, a first reflection surface where lights from the microdisplay are first reflected and emitted to the second reflection surface, and a third reflection surface where the reflected lights from the second reflection surface are continuously refracted and reflected.

In another aspect combinable with the general implementation, the first free-form optical component comprises a third reflection surface coated with a dielectric layer having a split ratio of 1:1, wherein half of lights from the microdisplay are reflected, and half of the lights from the microdisplay are refracted.

In another aspect combinable with the general implementation, the second free-form optical component comprises a fourth reflection surface having the same curvature as a third reflection surface of the first free-form optical component and glued with the third reflection surface.

In another aspect combinable with the general implementation, the second free-form optical component comprises a fifth reflection surface which is a free-form surface and having a fifth vertex radius of curvature larger than a second vertex radius of curvature of a second reflection surface of the first free-form optical component.

In another aspect combinable with the general implementation, the second free-form optical component and the first free-form optical component are made of the same material.

In another aspect combinable with the general implementation, the first free-form optical component comprises a second reflection surface, a first reflection surface where lights from the microdisplay are first reflected and emitted to the second reflection surface, and a third reflection surface where the reflected lights from the second reflection surface are continuously refracted and reflected, wherein the first reflection surface, the second reflection surface, and the third reflection surface are all XY-polynomial surface.

In another aspect combinable with the general implementation, the first free-form optical component comprises a first reflection surface arranged face to the microdisplay, a second reflection surface face to the first reflection surface, and a third reflection surface face to the second reflection surface.

In another aspect combinable with the general implementation, the microdisplay comprises an aspheric surface face to a first reflection surface of the first free-form optical component and is configured to provide lights emitted towards the first reflection surface.

In another aspect combinable with the general implementation, the first free-form optical component comprises a first reflection surface having a negative value of a first radius of curvature, a second reflection surface having a negative value of a second radius of curvature, and a third reflection surface having a negative value of a third radius of curvature.

In another aspect combinable with the general implementation, the first free-form optical component comprises a first reflection surface having a first radius of curvature, a second reflection surface having a second radius of curvature, and a third reflection surface having a third radius of curvature, wherein the third radius of curvature is larger than the second radius of curvature, and the second radius of curvature is larger than the first radius of curvature.

In another aspect combinable with the general implementation, the second free-form optical component comprises a fourth reflection surface having a fourth radius of curvature which is the same as a third radius of curvature of a third reflection surface, and a fifth reflection surface having a fifth radius of curvature larger than the fourth radius of curvature.

In another aspect combinable with the general implementation, the second free-form optical component comprises a fourth reflection surface with a negative value of a fourth radius of curvature and a fifth reflection surface with a positive value of a fifth radius of curvature.

In another aspect combinable with the general implementation, the first free-form optical component comprises a first reflection surface, a second reflection surface, and a third reflection surface, wherein the first reflection surface, the second reflection surface, and the third reflection surface are all free form surface.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above and below as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be too precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

FIGS. 11A, 11B, 12, 13, and 14 are tables showing properties of surfaces from the first free-form optical component and the second free-form optical component according to an aspect of the embodiment.

DETAILED DESCRIPTION OF THE EMBODIMENTS

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It shall be understood that the term "means," as used herein, shall be given its broadest possible interpretation in accordance with 35 U.S.C., Section 112 (f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Unless defined otherwise, all technical and position terms used herein have the same meaning as commonly understood by one of ordinary skill in the art to which the invention pertains. Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

According to the following embodiments, the vertex radius of curvature and radius of curvature are the reciprocal of the curvature. For example, for a curve, the vertex radius of curvature and radius of curvature equal the radius of the circular arc which best approximates the curve at that point. For surfaces, the radius of curvature is the radius of a circle that best fits a normal section or combinations thereof.

Figure 1:
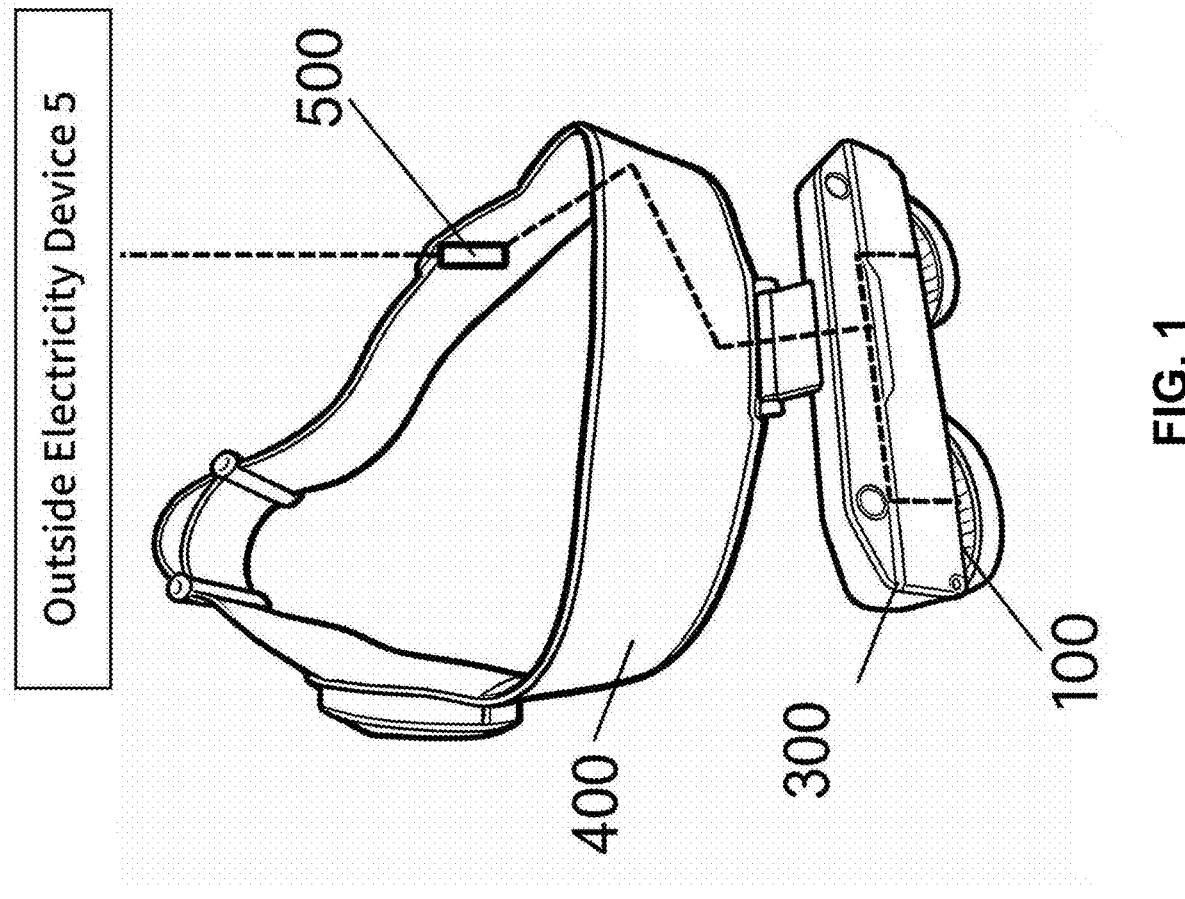
FIG. 1 and FIG. 2 are perspective views of a wearable device system for cross-reality visions according to an aspect of the embodiment.
Figure 2:
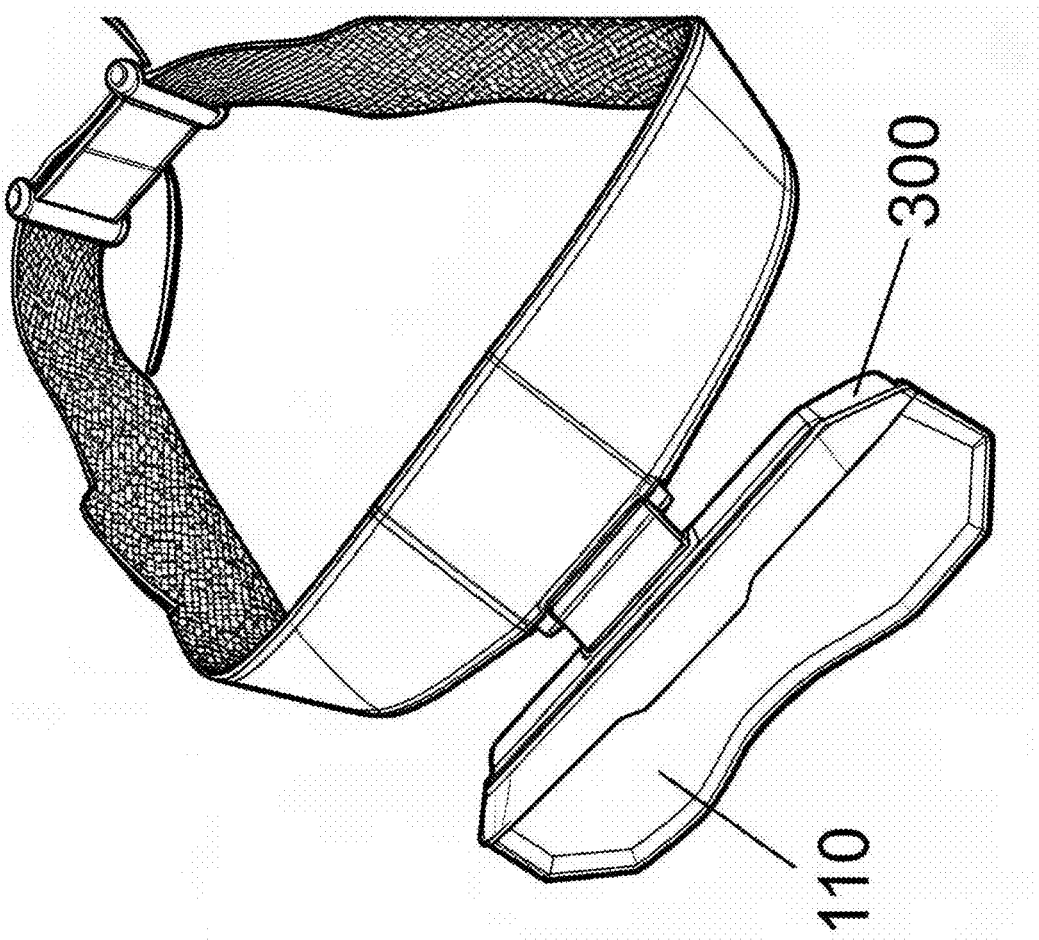
Figure 3:
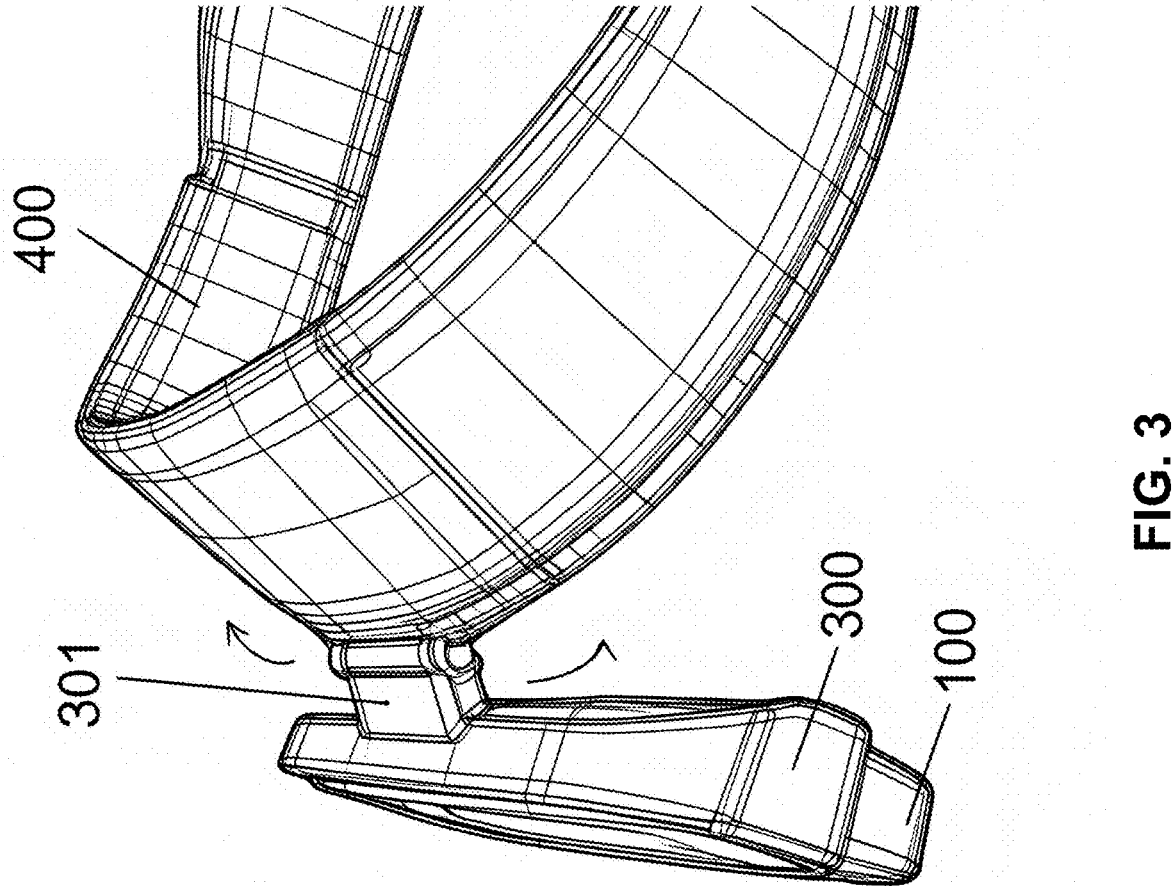
FIG. 3 is a side view of the wearable device system for cross-reality visions according to an aspect of the embodiment.

FIGS. 1-3 generally depict a wearable device system for a cross-reality vision, wherein the cross-reality vision may comprise a virtual reality image, an augmented reality image, a real-world image, and a mixed reality image according to an aspect of the embodiment.

Referring to FIG. 1 and FIG. 2, the wearable device system 10 may comprise an optical combiner 100 configured to receive a virtual reality content from an outside electricity device 200. In some embodiments, the wearable device system 10 may further comprise a supporting frame 300 where the optical combiner 100 is supported and affixed thereon. In still some embodiments, the wearable device system 10 may further comprise a wearable band 400 coupled to the supporting frame 300, wherein the wearable band 400 may be utilized to be coupled to the observer's head. In still some embodiments, the wearable device system 10 may further comprise a processor 500 wirelessly or wiredly communicated with the outside electricity device 200, and in such a way, the virtual reality content may be transmitted to the processor 500 and be executed by the processor 500 to display on the optical combiner 100.

In still some embodiments, as shown in FIG. 2, the wearable device system 10 may comprise a lens cover 110 detachably and fully covered on an outer surface of the optical combiner 100 to prevent lights from outside of the optical combiner 100.

Continuing to FIG. 3, in some embodiments, the supporting frame 300 may comprise an adjustable frame 301 angledly and pivotally coupled to the wearable band 400. In some embodiments, the adjustable frame 301 may be rotatably coupled with the wearable band 400, and in such a way, the adjustable frame 301 may be rotated to form at a predetermined angle with respect to the wearable band 400. In still some embodiments, the adjustable frame 301 may be angledly and integrally extended from the supporting frame 300 and pivotally and rotatably coupled with the wearable band 400. It should be noted that, in some embodiments, the optical combiner 100 may be partially embedded inside the supporting frame 300, and in such a manner, the optical combiner 100 may be securely affixed on the supporting frame 300, and at the same time, the exposed optical combiner 100 may be observed by an observer. In still some embodiments, the optical combiner 100 may be partially inserted and embedded into the supporting frame 300 to secure the optical combiner 100 on the supporting frame 300.

Figure 4:
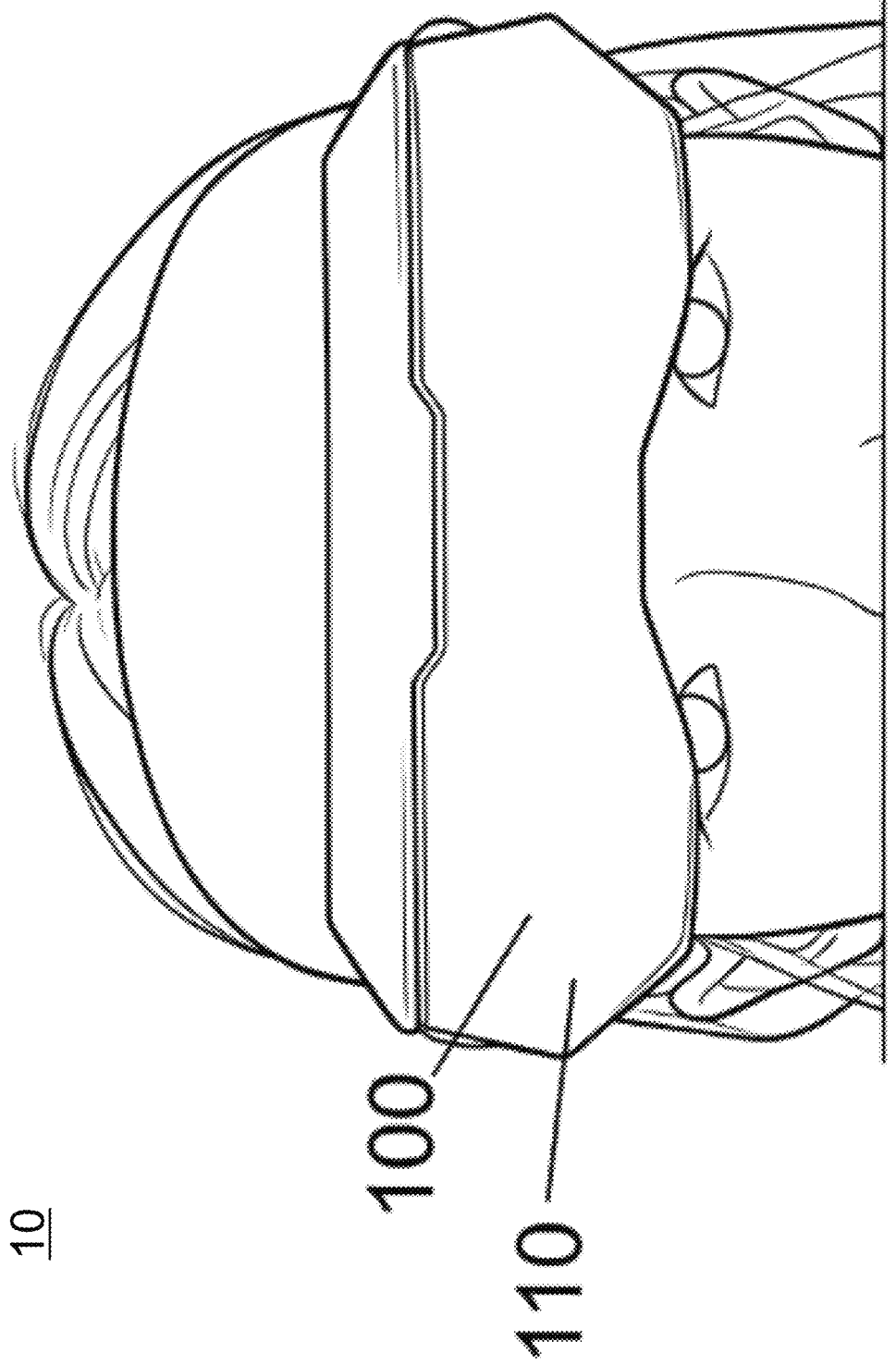
FIG. 4 is a front view showing the observer wearing the wearable device system for cross-reality visions according to an aspect of the embodiment.
Figure 5:
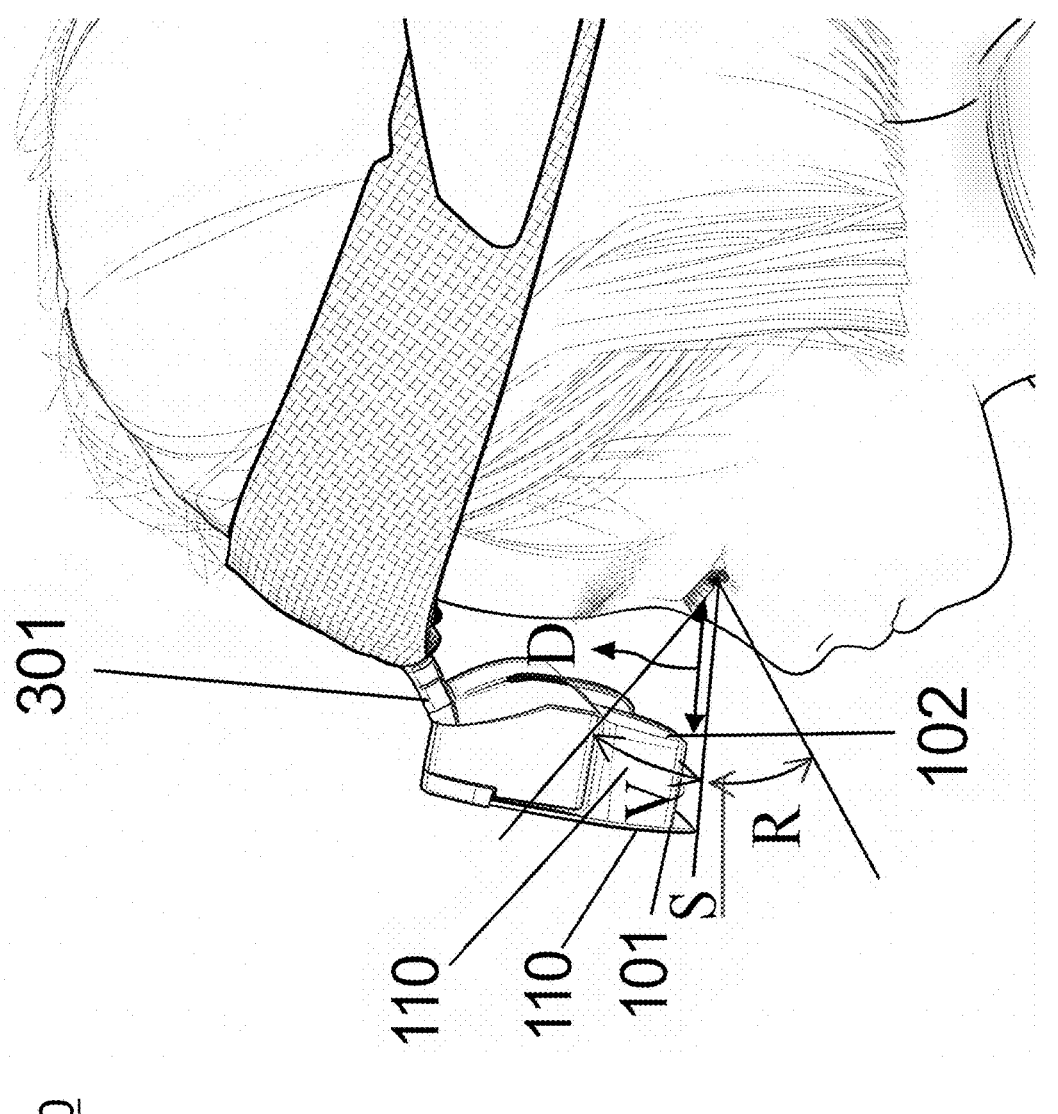
FIG. 5 is a side view showing the observer wearing the wearable device system for cross-reality visions according to an aspect of the embodiment.

FIG. 4 and FIG. 5 generally depict the wearable device system 10 used by the observer according to an aspect of the embodiments.

Referring to FIG. 4, the optical combiner 100 may be configured to partially cover the eyes of the observer. Continuing to FIG. 5, the optical combiner 100 may remain at a visual distance "D" of 17 mm to 22 mm from the eye of the observer.

Figure 6:
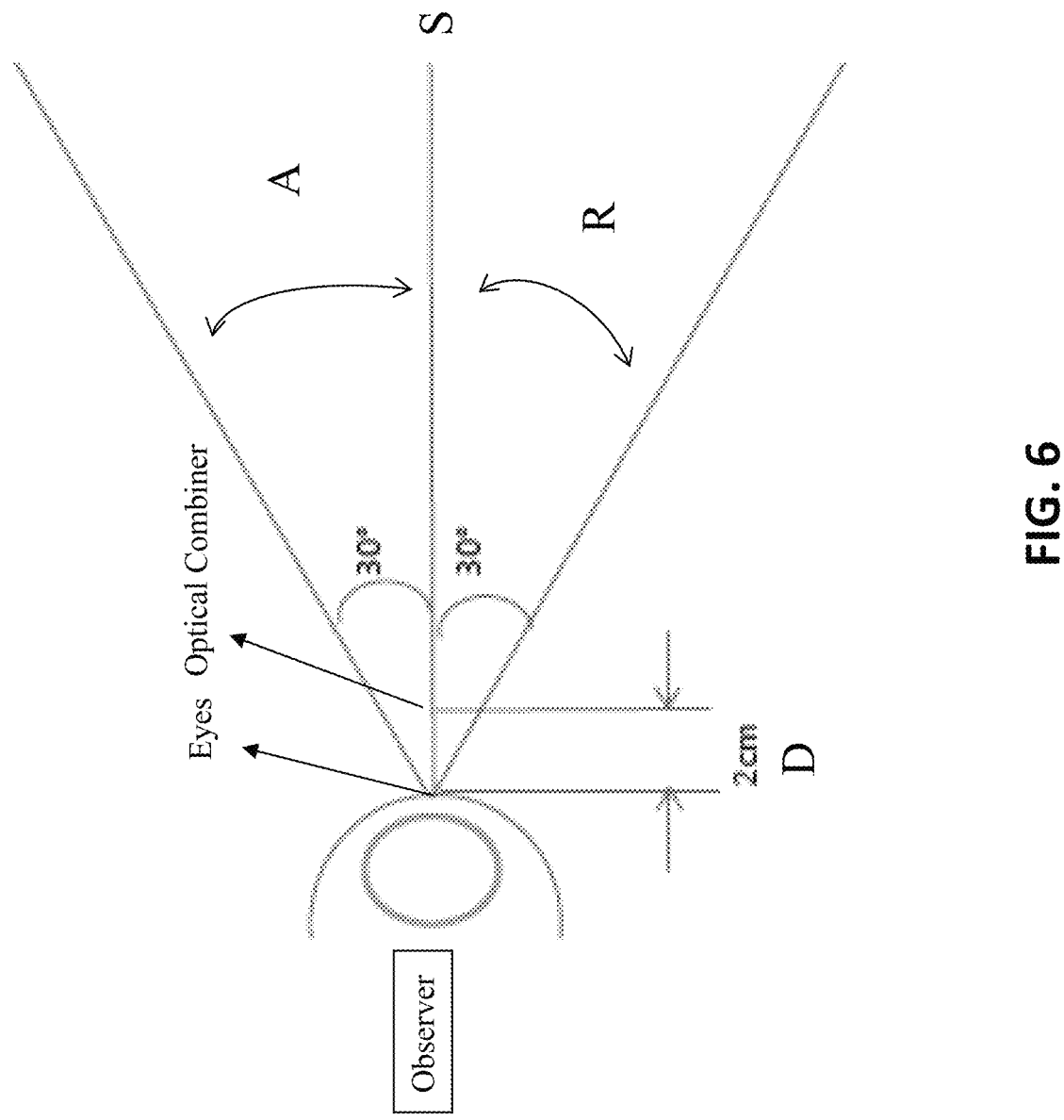
FIG. 6 is a schematic diagram showing the wearable device system used by the observer according to an aspect of the embodiment.

FIG. 6 generally depicts a schematic diagram showing the wearable device system used by the observer according to an aspect of the embodiments.

As shown in FIG. 5 and FIG. 6, in some embodiments, the wearable device system may further comprise a lens cover 110 selectively, detachably and fully covered on an outer surface 101 of the optical combiner 100, and the optical combiner 100 may further comprise an inner surface 102 face towards the eyes of the observer. In still some embodiments, the outer surface 101 of the optical combiner 100 may be the opposite side of the inner surface 102 of the optical combiner 100.

In some embodiments, continuing to FIG. 6, while the lens cover does not cover the outer surface of the optical combiner 100, the adjustable frame 301 may be rotated to form a predetermined angle and form the visual distance "D" between the optical combiner 100 and the eyes of the observer, and at this situation, the wearable device system may further comprise a real-world field of view "R" of up to 30 degrees below a straight-ahead view "S" and an augmented reality field of view "A" of up to 30 degrees above the straight-ahead view "S," wherein the real world field of view "R" allows the user to see a real-world image/scene and an augmented reality image is projected into the augmented reality field of view "A." In some embodiments, the real-world field of view "R" and the augmented reality field of view "A" may not overlap.

Referring to FIG. 5, while the lens cover 110 is fully covered on the outer surface 101 of the optical combiner 100, the adjustable frame 301 may be rotated to form a predetermined angle and form the visual distance "D" between the optical combiner 100 and the eyes of the observer, and at this situation, the wearable device system may further comprise the real world field of view "R" of up to 30 degrees below the straight-ahead view "S" and a virtual reality field of view "V" of up to 30 degrees above the straight-ahead view "S," wherein the real world field of view "R" allows the user to see the real-world scene/images and a virtual reality image is projected into the virtual reality field of view "V." In still some embodiments, the real-world field of view "R" and the virtual reality field of view "V" may not overlap.

In still some embodiments, the adjustable frame 301 may be moved towards the observer or away from the observer to obtain the visual distance "D" between the optical combiner 100 and the eye of the observer; therefore, it is beneficial for the observer who wears a glasses.

Figure 7:
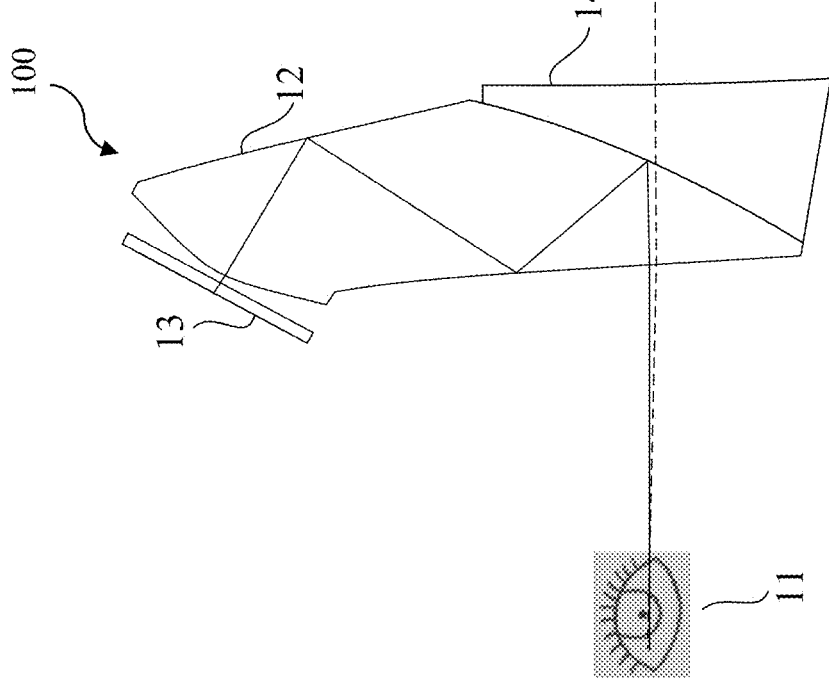
FIG. 7 is a schematic view of the optical combiner of the wearable device system according to an aspect of the embodiment.

FIG. 7 generally depicts the optical combiner of the wearable device system according to an aspect of the embodiments.

Referring to FIG. 7, the optical combiner 100 may comprise a first free-form optical component 12, a second free-form optical component 14, and a microdisplay 13.

In some embodiments, the microdisplay 13 may be an aperture and configured to generate and/or provide lights to the first free-form optical component 12, wherein the microdisplay 13 may be arranged adjacent to the first free-form optical component 12. In still some embodiments, the first free-form optical component 12 may comprise a non-aspheric surface 12d having a vertex radius of curvature of above 7, and in such a way, lights from the microdisplay 13 are refracted into the first free-form optical component 12 through the non-aspheric surface 12d of the first free-form optical component 12. In still some embodiments, the non-aspheric surface 12d of the first free-form optical component 12 may be a convex surface.

Figure 8:
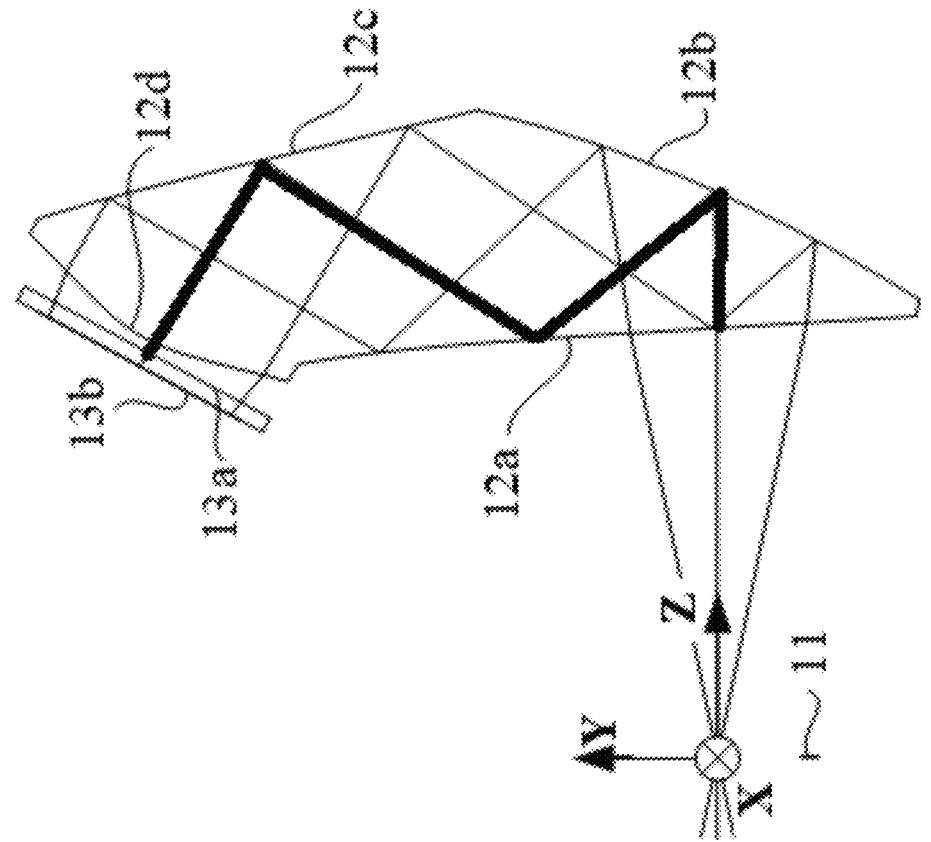
FIG. 8 is a schematic view of the first free-form optical component of the optical combiner according to an aspect of the embodiment.

FIG. 8 generally depicts the first free-form optical component of the optical combiner according to an aspect of the embodiments.

Referring to FIG. 8, the first free-form optical component 12 may comprise a second reflection surface 12a, a first reflection surface 12c where lights from the microdisplay 13 are first reflected and emitted to the second reflection surface 12a, and a third reflection surface 12b where the reflected lights from the second reflection surface 12a are continuously refracted and reflected.

In some embodiments, see the bold line shown in FIG. 8, the second reflection surface 12a may be a refracted surface and also a reflected surface, wherein while the lights from the microdisplay 13 are reflected by the first reflection surface 12c and emitted to the second reflection surface 12a. The lights are first completely reflected by the second reflection surface 12a and emitted to the third reflection surface 12b. Then, the lights are continuously reflected back to the second reflection surface 12a. Continuously, the lights reflected from the third reflection surface 12b may be refracted into the second reflection surface 12a. In such a way, the lights with a second-time reflection back from the third reflection surface 12b to the second reflection surface 12a may be continuously refracted into the second reflection surface 12a and entered into the eyes of the observer 11.

Figures 9A, 9B:
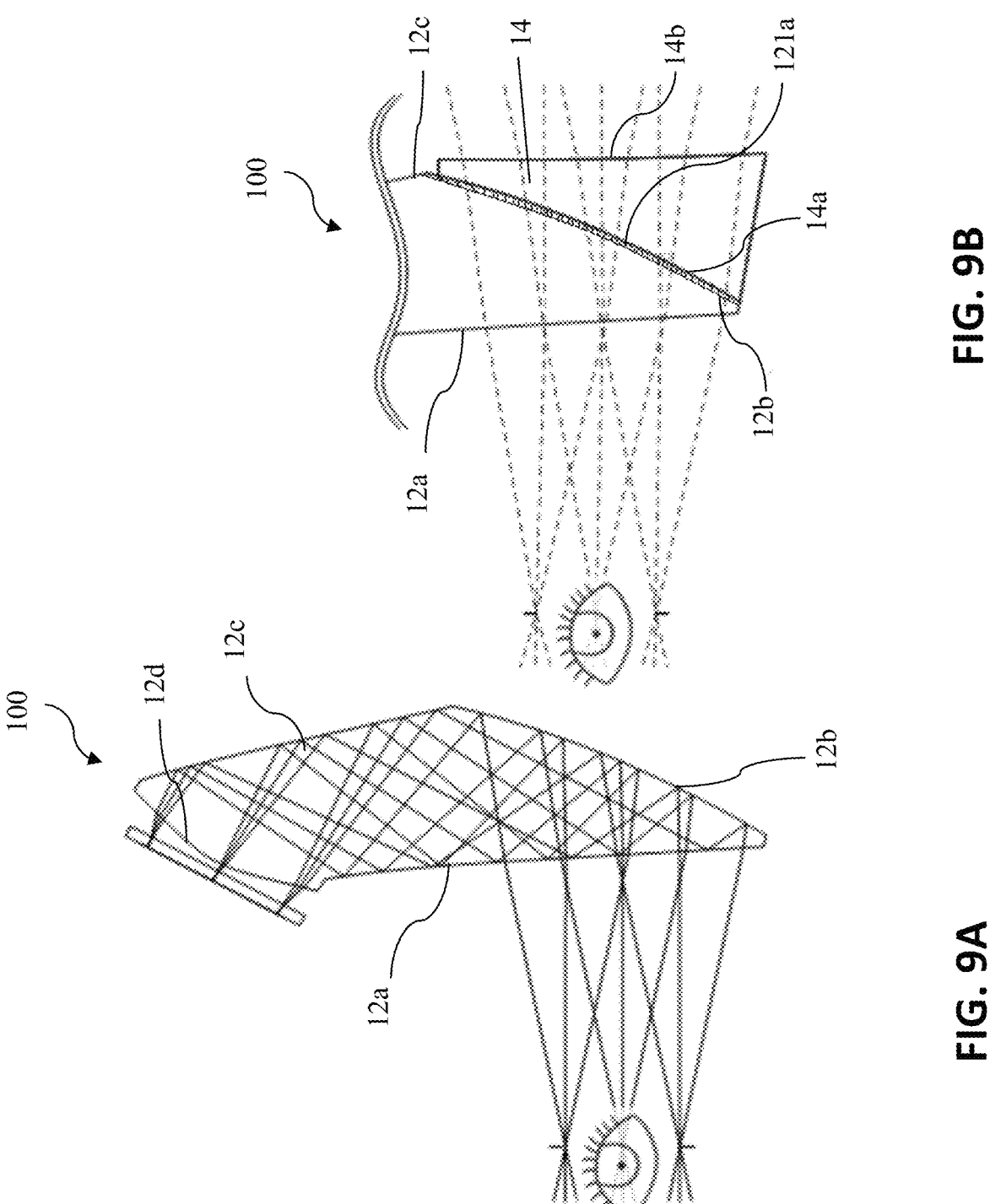
FIG. 9A and FIG. 9B are schematic views of the reflection effect and the refraction effect of the optical combiner according to an aspect of the embodiment.

FIG. 9A and FIG. 9B generally depict the reflection effect and the refraction effect of the optical combiner according to an aspect of the embodiments.

In some embodiments, as shown in FIG. 9A and FIG. 9B, the lights reflected from the third reflection surface 12b to the second reflection surface 12a may be refracted into the second reflection surface 12a and entered into the eye of the observer 11. In still some embodiments, the third reflection surface 12b may be coated with a dielectric layer 121a having a split ratio of 1:1, wherein half of the lights reflected from the second reflection surface 12a to the third reflection surface 12b may be reflected back to the second reflection surface 12a by the third reflection surface 12b and half of the lights reflected from the second reflection surface 12a may be refracted into the second free-form optical component 14 through the third reflection surface 12b.

Figure 10:
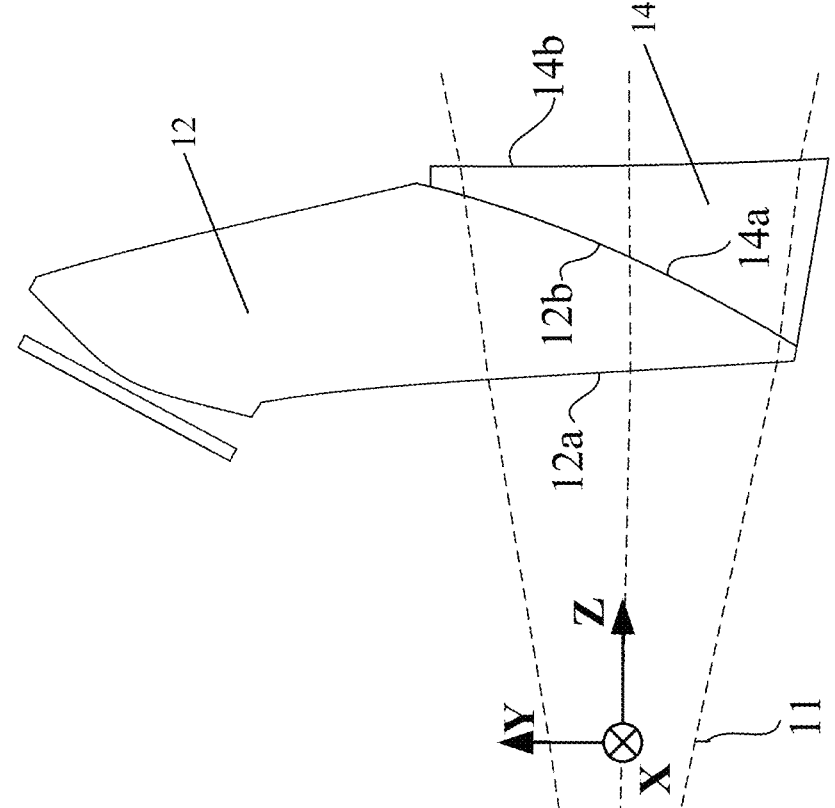
FIG. 10 is a schematic view of the first free-form optical component glued with the second free-form optical component according to an aspect of the embodiment.

FIG. 10 generally depicts that the first free-form optical component 12 is glued with the second free-form optical component 14 according to an aspect of the embodiments.

Referring to FIG. 10, the second free-form optical component 14 may comprise a fourth reflection surface 14a having the same curvature as the third reflection surface 12b of the first free-form optical component 12, wherein the third reflection surface 12b of the first free-form optical component 12 may be overlapped with and glued with the fourth reflection surface 14a of the second free-form optical component 14.

FIGS. 11A to 11B show properties of a fifth reflection surface 14b of the second free-form optical component 14 and a second reflection surface 12a of the first free-form optical component 12.

Referring to FIG. 11A, the second free-form optical component 14 may comprise a fifth reflection surface 14b arranged face to the fourth reflection surface 14a, wherein the fifth reflection surface 14b may be a free-form surface having a fifth vertex radius of curvature larger than a second vertex radius of curvature of a second reflection surface 12a of the first free form optical component 12. It should be noted that, in some embodiments, the second free-form optical component 14 and the first free-form optical component 12 may be made of the same material.

Referring to FIG. 11B, the fifth reflection surface 14b and the second reflection surface 12a may be all XY-polynomial surfaces.

FIG. 12 shows the properties of the microdisplay 13, the first reflection surface 12c, the second reflection surface 12a, the third reflection surface 12b, and the non-aspheric surface 12d according to an aspect of the embodiments.

Referring to FIG. 12, the first free-form optical component 12 may comprise the second reflection surface 12a, the first reflection surface 12c where lights from the microdisplay 13 are first reflected and emitted to the second reflection surface 12a, and a third reflection surface 12b where the reflected lights from the second reflection surface 12a are continuously refracted and reflected, and in such a way, the second reflection surface 12a may be the reflection surface and the refraction surface. In some embodiments, the non-aspheric surface 12d may be a refraction surface, wherein the lights from the microdisplay 13 may be emitted to the non-aspheric surface 12d and are refracted into the first free-form optical component 12 through the non-aspheric surface 12d. It should be noted that, in some embodiments, the first reflection surface 12c, the second reflection surface 12a, and the third reflection surface 12b are all XY-polynomial surfaces.

In some embodiments, the non-aspheric surface 12d may be satisfied with the following equation:

$$z = \frac{cr^2}{1 + \sqrt{1 - c^2 r^2}} + \sum_{i=2}^{10} A_i r^{2i}$$

c is the reciprocal of the radius of curvature, γ is the radial distance of a point on the surface, and $A_i$ is the coefficient of the higher-order term.

As shown in further details in FIG. 8, the first free-form optical component 12 may comprise the first reflection surface 12c arranged face to the microdisplay 13, the second reflection surface 12a face to the first reflection surface 12c, and the third reflection surface 12b face to the second reflection surface 12a, wherein the microdisplay 13 may comprise an aspheric surface 13a face to the first reflection surface 12c of the first free-form optical component 12 and configured to provide lights emitted towards the first reflection surface 12c. It should be noted that, in some embodiments, the microdisplay 13 may further comprise an opposite aspheric surface 13b opposite of the aspheric surface 13a of the microdisplay 13. In some embodiments, the aspheric surface 13a of the microdisplay 13 which is face to the first reflection surface 12c of the first free-form optical component 12, is a refraction surface, and the opposite aspheric surface 13*b* of the microdisplay 13 is neither a refraction nor reflection surface.

Referring to FIG. 12, the first free-form optical component 12 may comprise the first reflection surface 12*c* having a negative value of a first radius of curvature (−150.5), the second reflection surface 12*a* having a negative value of a second radius of curvature (−62.9), and the third reflection surface 12*b* having a negative value of a third radius of curvature (−41.6).

In some embodiments, the first free-form optical component 12 may comprise the first reflection surface 12*c* having a negative value of a first radius of curvature (−150.5), the second reflection surface 12*a* having a negative value of a second radius of curvature (−62.9), and the third reflection surface 12*b* having a negative value of a third radius of curvature (−41.6), wherein the third radius of curvature (−41.3) may be larger than the second radius of curvature (−62.9), and the second radius of curvature (−62.9) may be larger than the first radius of curvature (−150.5), and in such a way, the first reflection surface 12*c*, the second reflection surface 12*a*, and the third reflection surface 12*b* are all concave surfaces.

Referring to FIG. 10, FIG. 11A. FIG. 11B, FIG. 13 and FIG. 14, the second free-form optical component 14 may comprise the fourth reflection surface 14*a* having a fourth radius of curvature, which is the same as the third radius of curvature (−41.6) of the third reflection surface 12*b* (since the third reflection surface 12*b* of the first free-form optical component 12 is overlapped and glued on the fifth reflection surface 14*b* of the second free-form optical component 14) and the fifth reflection surface 14*b* having the fifth radius of curvature (372.40) larger than the fourth radius of curvature (−41.6), and in such a way, a curvature of the fifth reflection surface 14*b* of the second free-form optical component 14 is smaller than a curvature of the fourth reflection surface 14*a* of the second free-form optical component 14. In some embodiments, the fourth reflection surface 14*a* is a concave surface, and the fifth reflection surface 14*b* is a convex surface.

Continuing to FIG. 11A and FIG. 13, the first free-form optical component 12 may comprise the first reflection surface 12*c*, the second reflection surface 12*a*, and the third reflection surface 12*b*, wherein the first reflection surface 12*c*, the second reflection surface 12*a*, the third reflection surface 12*b*, the fourth reflection surface 14*a* of the second free-form optical component 14, and the fifth reflection surface 14*b* of the second free-form optical component 14 are all free-form surfaces, wherein all the free-form surfaces (the first reflection surface 12*c*, the second reflection surface 12*a*, the third reflection surface 12*b*, the fourth reflection surface 14*a* of the second free-form optical component 14, and the fifth reflection surface 14*b* of the second free-form optical component 14) may be satisfied with the following equations:

$$z = \frac{cr^2}{1 + \sqrt{1 - c^2 r^2}} + \sum_{i=2}^{66} A_i x^m y^n, \, i = \frac{(m+n)^2 + m + 3n}{2} + 1$$

c is the reciprocal of the radius of curvature, $\gamma$ is the radial distance of a point on the surface, k is the quadric constant, and $A_i$ is the coefficient of the higher-order term.

It should be noted that, in some embodiments, the second free-form optical component 14 may comprise the fourth reflection surface 14*a* having a negative value of a fourth radius of curvature, which is the same as the third radius of curvature (−41.6) of the third reflection surface 12*b*, and the fifth reflection surface 14*b* having a positive value of a fifth radius of curvature (372.40). In some embodiments, the fourth reflection surface 14*a* of the second free-form optical component 14 may be a concave surface and the fifth reflection surface 14*b* of the second free-form optical component 14 may be a convex surface.

In some embodiments, in order to approach a high-performance near-eye display system, it is necessary to limit the thickness of the optical combiner 10; in particular, the microdisplay 13 may be a self-luminous display with a diagonal size of 0.71 (from 0.65 to 0.75 inches) inches, an aspect ratio larger than and equal to 16:9, the field of view of the microdisplay of 45°, the optical path distortion of the virtual image display of 0.4% (less than 0.5%), and the total thickness of the optical combiner 100 of 10.6 mm (less than 11 mm). Since the optical combiner 11 may be partially inserted into the supporting frame 300, the total thickness of the optical combiner cannot be designed to be larger than 11 mm, and the optical combiner 100 needs to be thin enough to be secured on the supporting frame 300.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

Thus, specific embodiments and applications of the wearable device system for cross-reality visions have been disclosed. It should be apparent, however, to those skilled in the art that many more modifications besides those already described are possible without departing from the disclosed concepts herein. The disclosed embodiments, therefore, are not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

What is claimed is:

1. A wearable device system for a cross-reality vision, including a virtual reality image, an augmented reality image, a real-world image, and a mixed reality image, comprising:

an optical combiner configured to receive a virtual reality content from an outside electricity device;

a supporting frame where the optical combiner is supported thereon;

a wearable band coupled to the supporting frame; wherein the supporting frame comprises an adjustable frame angledly and integrally extended from the supporting frame and pivotally and rotatably coupled to the wearable band;

wherein the optical combiner is configured to partially cover eyes of an observer and comprises a first free-form optical component, a second free-form optical element overlappedly arranged with the first free-form optical component, and a microdisplay arranged adjacent to the first free-form optical component.

2. The wearable device system of claim 1, wherein the optical combiner is partially embedded inside the supporting frame and is rotated to be moved towards and away from the eyes of the observers to be remained at a visual distance of 17 mm to 22 mm from the eyes of the observer.

3. The wearable device system of claim 1, further comprising a lens cover detachably and fully covered on an outer surface of the optical combiner to prevent lights from outside the optical combiner.

4. The wearable device system of claim 1, further comprising a lens cover detachably and fully covered on an outer surface of the optical combiner, and the optical combiner comprises an inner surface face towards the eye of the observer and formed on an opposite side of the outer surface.

5. The wearable device system of claim 1, further comprising a real-world field of view of up to 30 degrees below a straight-ahead view and an augmented reality field of view of up to 30 degrees above the straight-ahead view, wherein the real-world field of view allows the user to view real-world images and an augmented reality image is projected into the augmented reality field of view, wherein the real-world field of view and the augmented reality field of view are not overlapped.

6. The wearable device system of claim 1, further comprising a lens cover fully covered on an outer surface of the optical combiner, a real-world field of view of up to 30 degrees below a straight-ahead view, and a virtual reality field of view of up to 30 degrees above the straight-ahead view, wherein the real world field of view allows the user to view a real-world image and a virtual reality image is projected into the virtual reality field of view, wherein the real-world field of view and the virtual reality field of view are not overlapped.

7. The wearable device system of claim 1, wherein the first free-form optical component comprises a non-aspheric surface which is a convex surface and having a vertex radius of curvature of above 7 and arranged adjacent to and face to the microdisplay, wherein lights from the microdisplay are refracted into the first free-form optical component through the non-aspheric surface.

8. The wearable device system of claim 1, wherein the first free-form optical component comprises a second reflection surface, a first reflection surface where lights from the microdisplay are first reflected and emitted to the second reflection surface, and a third reflection surface where the reflected lights from the second reflection surface are continuously refracted and reflected.

9. The wearable device system of claim 1, wherein the first free-form optical component comprises a third reflection surface coated with a dielectric layer having a split ratio of 1:1, wherein half of lights reflected from a second reflection surface of the first free-form optical component are reflected by the third reflection surface and half of the lights reflected from a second reflection surface of the first free-form optical component are refracted into the second free-form optical component through the third reflection surface.

10. The wearable device system of claim 1, wherein the second free-form optical component comprises a fourth reflection surface having the same shape and curvature as a third reflection surface of the first free-form optical component, wherein the fourth reflection surface is overlapped and glued with the third reflection surface.

11. The wearable device system of claim 1, wherein the second free-form optical component comprises a fifth reflection surface which is a free-form surface having a fifth vertex radius of curvature larger than a second vertex radius of curvature of a second reflection surface of the first free-form optical component, wherein the fifth reflection surface is a convex surface and the second reflection surface is a concave surface.

12. The wearable device system of claim 1, wherein the second free-form optical component and the first free-form optical component are made of the same materials.

13. The wearable device system of claim 1, wherein the first free-form optical component comprises a second reflection surface, a first reflection surface where lights from the microdisplay are first reflected and emitted towards the second reflection surface, and a third reflection surface where the reflected lights from the second reflection surface are continuously refracted and reflected, wherein the first reflection surface, the second reflection surface, and the third reflection surface are all XY-polynomial surfaces and concave surfaces.

14. The wearable device system of claim 1, wherein the first free-form optical component comprises a first reflection surface face to the microdisplay, a second reflection surface face to the first reflection surface, and a third reflection surface face to the second reflection surface.

15. The wearable device system of claim 1, wherein the microdisplay comprises an aspheric surface face to a first reflection surface of the first free-form optical component and configured to provide lights emitted towards the first reflection surface, and an opposite aspheric surface formed on an opposite side of the aspheric surface, wherein the aspheric surface is a refraction surface and the opposite aspheric surface is neither a refraction surface nor a reflection surface.

16. The wearable device system of claim 1, wherein the first free-form optical component comprises a first reflection surface having a negative value of a first radius of curvature, a second reflection surface having a negative value of a second radius of curvature, and a third reflection surface having a negative value of a third radius of curvature.

17. The wearable device system of claim 1, wherein the first free-form optical component comprises a first reflection surface having a first radius of curvature, a second reflection surface having a second radius of curvature, and a third reflection surface having a third radius of curvature, wherein the third radius of curvature is larger than the second radius of curvature, and the second radius of curvature is larger than the first radius of curvature.

18. The wearable device system of claim 1, wherein the second free-form optical component comprises a fourth reflection surface having a fourth radius of curvature which is the same as a third radius of curvature of a third reflection surface, and a fifth reflection surface having a fifth radius of curvature larger than the fourth radius of curvature, wherein the fourth reflection surface is formed on an opposite side of the fifth reflection.

19. The wearable device system of claim 1, wherein the second free-form optical component comprises a fourth reflection surface having a negative value of a fourth radius of curvature and a fifth reflection surface having a positive value of a fifth radius of curvature, wherein the fifth reflection surface is a convex surface and the fourth reflection surface is a concave surface.

20. The wearable device system of claim 1, wherein the first free-form optical component comprises a first reflection surface, a second reflection surface, and a third reflection surface, wherein the first reflection surface, the second reflection surface, and the third reflection surface are all free form surfaces and are all concave surfaces.

* * * * *